United States Patent [19]

Ogasawara

[11] Patent Number: 5,224,455
[45] Date of Patent: Jul. 6, 1993

[54] GAS DISCHARGING DEVICE FOR CHARCOAL CANISTER

[75] Inventor: Shinya Ogasawara, Kanagawa, Japan

[73] Assignee: Nissan Motor Co., Ltd., Yokohama, Japan

[21] Appl. No.: 894,551

[22] Filed: Jun. 5, 1992

[30] Foreign Application Priority Data

Jun. 7, 1991 [JP] Japan .................. 3-136781

[51] Int. Cl.⁵ .............................. F02M 33/02
[52] U.S. Cl. ................... 123/519; 180/69.4
[58] Field of Search ............... 123/516, 518, 519, 520, 123/521; 180/69.4, 69.5, 313, 296

[56] References Cited

U.S. PATENT DOCUMENTS

| | | | |
|---|---|---|---|
| 3,845,841 | 11/1974 | Kloefkorn | 180/69.4 |
| 3,874,471 | 4/1975 | Kloefkorn | 123/518 |
| 4,300,511 | 11/1981 | Lang | 123/520 |
| 4,359,113 | 11/1982 | Latter et al. | 180/69.5 |
| 4,727,955 | 3/1988 | Honda et al. | 180/296 |
| 4,886,096 | 12/1989 | Reddy | 123/518 |
| 4,940,101 | 7/1990 | Bauder | 123/519 |
| 5,058,693 | 10/1991 | Murdock et al. | 123/519 |
| 5,111,900 | 5/1992 | Leitermann | 180/69.4 |

FOREIGN PATENT DOCUMENTS 62-110076 7/1987 Japan .

Primary Examiner—Willis R. Wolfe
Assistant Examiner—Thomas Moulis
Attorney, Agent, or Firm—Foley & Lardner

[57] ABSTRACT

A discharging device connected to a charcoal canister which is disposed in an engine compartment of an automotive vehicle. The discharging device includes a first hose connected to a bottom portion of the charcoal canister. A second hose is disposed in a space defined by a front side member of the automotive vehicle, and connected to the first hose. The second hose extends from a position in the engine compartment to a position under a passenger compartment of the automotive vehicle. A partition plate is connected to the front side member so as to divide the front side member space into two spaces at the position under the passenger compartment. The second hose passes through the partition plate so that the drained fuel vapor from the charcoal canister is discharged from the second hose passing through the partition plate.

4 Claims, 2 Drawing Sheets

GAS DISCHARGING DEVICE FOR CHARCOAL CANISTER

BACKGROUND OF THE INVENTION

1. Field of the Invention

The present invention relates to improvements in a discharging device for drained gas from a charcoal canister which is disposed in an engine compartment of an automotive vehicle.

2. Description of the Prior Art

Japanese Utility Model Provisional Publication No. 62-110076 discloses a typical device for discharging fuel vapor from a charcoal (or activated carbon) canister. The device is applied to the charcoal canister disposed in an engine compartment. A gas drain hose is attached to a bottom portion of the charcoal canister and extends to a front side member in the engine compartment. The other opening end of the drain hose is connected to the front side member so that the drained gas is diffused in the space defined by the front side member in the engine compartment. Therefore, after the charcoal canister stores a predetermined amount of the fuel vapor without the purging operation, excess fuel vapor is overflowed from the charcoal canister and discharged from the bottom portion of the charcoal canister to the atmosphere through the drain hose.

However, since the fuel vapor from the charcoal canister is discharged into the front side member located in the engine compartment, the discharged fuel vapor is sometimes led to a passenger compartment through the engine compartment and an air box from which air is fed to the passenger compartment. Then, vehicle passengers feel uncomfortable due to a peculiar odor of the discharged fuel vapor.

SUMMARY OF THE INVENTION

It is an object of the present invention to provide an improved discharging device which securely feeds the fuel vapor from a charcoal canister into the atmosphere without feeding into a passenger compartment.

A discharging device according to the present invention is for discharging fuel vapor from a charcoal canister disposed in an engine compartment of an automotive vehicle. The discharging device comprises a front side member extending from the engine compartment to a portion under a passenger compartment of the automotive vehicle. The front side member defines a space thereinside. A partition plate is connected to the front side member so as to divide the front side member space into two spaces at the portion under the passenger compartment. A drain hose includes first and second hose portions. The first hose portion extends from a bottom portion of the charcoal canister to the front side member located in the engine compartment. The second hose portion is connected to the first hose portion and extends to the partition plate in the front side member space. The second hose portion passes through the partition plate.

DETAILED DESCRIPTION OF THE INVENTION

Referring now to FIGS. 1 to 4, there is shown an embodiment of a discharging device for fuel vapor from a charcoal canister according to the present invention.

Figure 1:
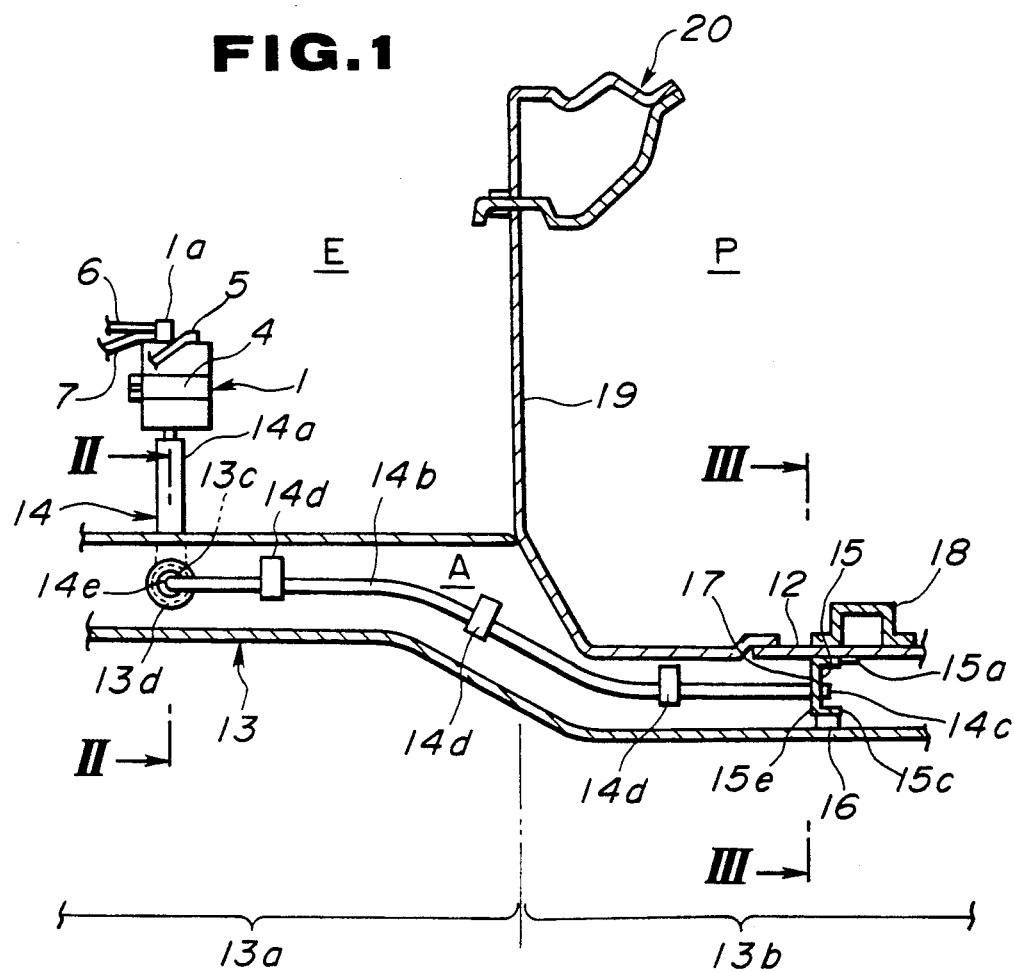
FIG. 1 is a schematic cross-sectional view of an embodiment of a discharging device for fuel vapor from a charcoal canister, as viewed from a lateral side of an automotive vehicle.

As shown in FIG. 1, a front side member 13 extends from an engine compartment E to an under portion of a floor panel 12 through a dash lower panel 19. A tubular space A is defined by the front side member 13, the dash lower panel 19, a hood-ridge panel 10 and the floor panel 12. A rear portion 13b, which is of a portion of the front side member 13 located under the floor panel 12, is disposed to be lower in height level than a front portion 13a, which is of a portion of the front side member located in the engine compartment E.

Figure 2:
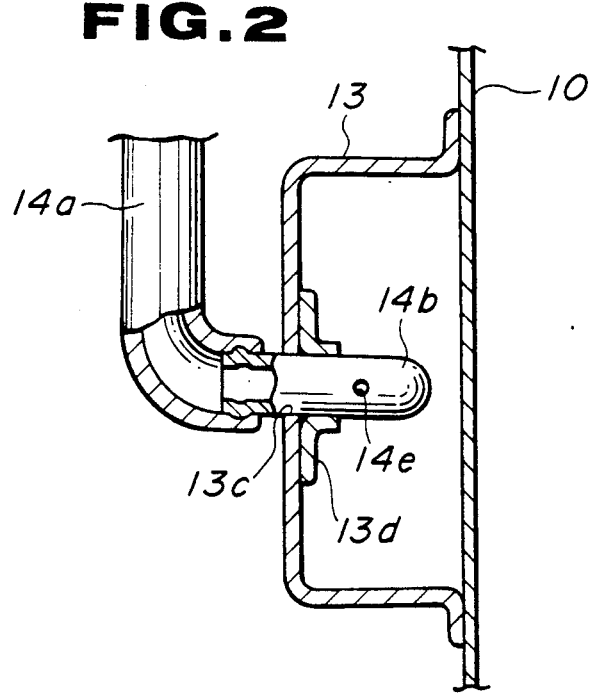
FIG. 2 is a cross-sectional view taken in the direction of arrows substantially along the line II—II of FIG. 1.
Figure 3:
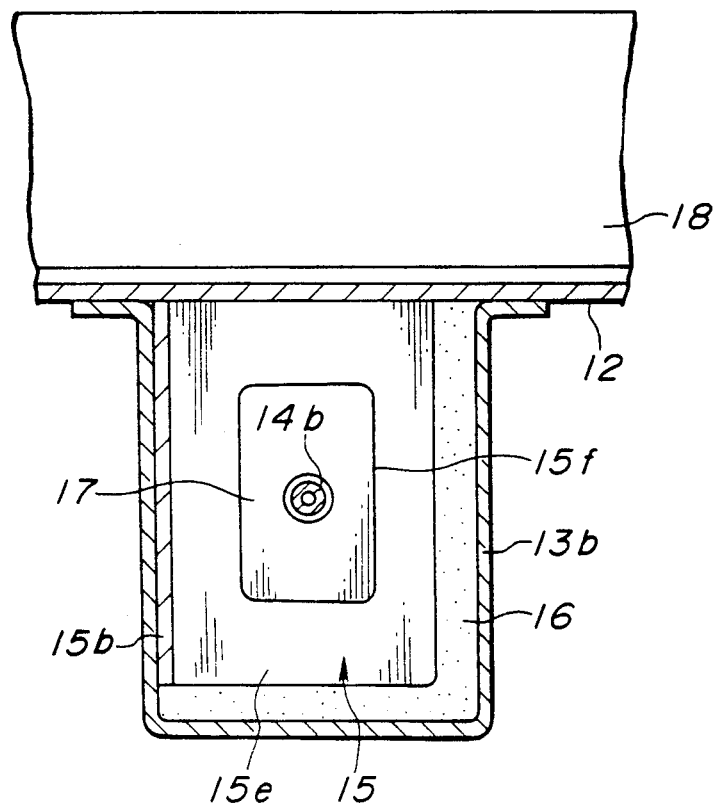
FIG. 3 is a cross-sectional view taken in the direction of arrows substantially along the line III—III of FIG. 1.
Figure 4:
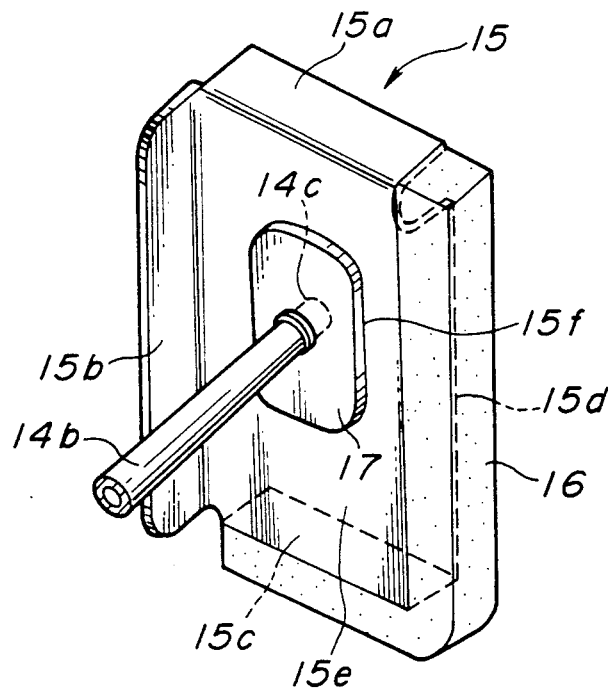
FIG. 4 is a perspective view of FIG. 3.

A charcoal canister 1 of a generally cylindrical shape includes activated carbon, a filter and the like, and is attached through bracket 4 to the hood-ridge panel 10 which is of a side wall defining the engine compartment E. The charcoal canister 1 is connected to a fuel vapor tube 5 communicated with a fuel tank (not shown) and a vacuum line tube 6 and a purging tube 7 which are connected to an intake manifold (not shown). A drain hose 14 constituted by first and second hoses 14a and 14b is connected to the bottom portion of the charcoal canister 1. The drain hose 14 is extended into the space A. As shown in FIG. 2, an opening 13c is made in a side wall of the front side member 13 in the front portion 13a. A reinforcing member 13d is fixed to a portion which surrounds the opening 13c. The second hose 14b of the drain hose 14 is disposed to pass through the opening 13c and the reinforcing member 13d, and extends to the rear portion 13b. An end portion of the second hose 14b projects from the front side member 13, and is connected to one end of the first hose 14a. The other end of the first hose 14a is connected to the bottom portion of the charcoal canister 1. The second hose 14b is fixedly supported to the front side member 13 through a plurality of supporting members 14d. As shown in FIGS. 3 and 4, the rear end portion 14c of the second hose 14b is disposed to pass through a partition plate 15e disposed in the rear portion 13b of the front side member 13. The partition plate 15e has four flanges 15a, 15b, 15c and 15d as shown in FIG. 4. The flanges 15a and 15b are fittingly fixed to the inner surfaces of the floor panel 12 and the front side member 13, respectively. A foamed rubber 16 connected to the flanges 15c and 15d is fittingly connected to the inner surface of the front side member 13. Accordingly, the space A in the front side member 13 is sealingly divided into two spaces by the partition member 15 made of the partition plate 15e and the foamed rubber 16. The flange 15a is fixedly connected to a cross member 18 through the floor panel 12. The partition plate 15e is provided at its generally center portion with a hole 15f through which the rear end portion 14c of the second hose 14b passes. A seal member 17 is disposed around the hole 15f and supports the second hose 14b so that the opening of the rear end portion 14c is positioned at a portion rearward of the partition plate 15e. The second hose 14b is formed with about an 8 mm inner diameter.

A plurality of small holes 14e are made in the second hose 14b disposed in the front portion 13a. The small holes 14e are for guiding purging air and are located at a middle height portion relative to the diametrical direction of the second hose 14b. Since the front portion 13a is higher in height level than the rear portion 13b, the small hole 14e is located at a portion which is higher in height level than the floor panel 12. Since the small hole 14e is formed with about a 2 mm diameter, almost all of the drained fuel vapor is discharged from the opening 14c of the second hose 14b without being discharged into the engine compartment through the small hole 14e. Furthermore, the small hole 14e is formed so that the flow resistance of air for the small hole 14e is smaller than that of water for the opening of the rear end portion 14c. Accordingly, even if the rear end portion 14c is put in water, fresh air is supplied to the charcoal canister 1 through the small hole 14e.

The manner of operation of the thus arranged device will be discussed hereinafter.

When the engine of the automotive vehicle is stopped, the fuel vapor from the fuel tank is fed to the charcoal canister 1 through the evaporation gas tube 5. After the charcoal canister 1 absorbs hydro-carbon (HC) of the fuel vapor and a predetermined amount of the fuel vapor, the fuel vapor flows into the first hose 14a from the charcoal canister 1. The fuel vapor fed to the first hose 14a is discharged from the opening of the rear end portion 14c of the second hose 14b to the rear portion of the partition plate 15e, and discharged from the discharge hole (not shown) to the atmosphere. That is to say, the fuel vapor fed to the first hose 14a is discharged from a lower portion of the floor panel 12, and the discharged fuel vapor is prevented from returning to the engine compartment portion 13a due to the partition plate 15e and the foamed rubber 16. Accordingly, the fuel vapor discharged from the charcoal canister 1 is prevented from being fed to a passenger compartment P through the engine compartment E and an air box 20 disposed between the engine and the passenger compartments. While the small hole 14e is disposed in the second hose 14b located in the engine compartment E, the fuel vapor fed to the second hose 14b is almost all discharged from the opening of the rear end portion 14c without being discharged from the small hole 14e since the small hole 14e is sufficiently small in diameter as compared with the opening of the rear end portion 14c.

During the engine operation, a purge control valve 1a is opened to communicate the charcoal canister 1 and the engine in the event that a predetermined negative pressure from an intake manifold is applied to the purge control valve 1a through a vacuum line tube 6. In response to the opening of the purge control valve 7, fresh air is fed into the charcoal canister 1 through the opening of the rear end portion 14c and the small hole 14e. The fuel vapor stored in the charcoal canister 1 is purged into the engine by the fresh air.

In general, the rear portion 13b of the front side member 13 is lower in height level than the front portion 13a. Accordingly, it may happen that the rear end portion 14c is dipped in water when the automotive vehicle is driven on a flooded road and the like. However, even if the rear end portion 14c of the second hose 14b is dipped in water, the small hole 14e is not dipped in water in most cases. Therefore, the fuel vapor stored in the charcoal canister 1 can be purged by the fresh air from the small hole 14e without sucking water from the rear end portion 14c. Since the partition plate 15e is connected to the second cross member 18 disposed on the floor panel 12 through the floor panel 12, the rigidity of this portion is increased and, therefore, this suppresses the generation of noises to the passenger compartment.

While the drain hose 14a has been shown and described as being constituted by the first hose 14a and the second hose 14b, it will be understood that the drain hose 14 may be constituted by a hose or by three or more hoses.

Although the small hole 14e has been shown and described as being formed at a middle height portion of the diameter of the second hose 14b, it will be understood that the small hole may be formed at an upper height portion of the diameter of the second hose 14b.

While the partition member 15 has been shown and described as being made by the partition plate 15e and the foamed rubber 16, it will be understood that other methods for partitioning the space A may be applied to this arrangement.

Although the small hole 14e and the opening of the rear end portion 14c are formed about 2 mm and 8 mm in diameter, respectively, it will be understood that the small hole and the opening may be formed in other sizes with due regard to the balance therebetween.

What is claimed is:

1. A device for discharging fuel vapor from a charcoal canister disposed in an engine compartment of an automotive vehicle, said device comprising:

a front side member extending from the engine compartment to a portion under a passenger compartment of the automotive vehicle, said front side member defining a space thereinside;

a partition plate connected to said front side member at the portion under the passenger compartment, said partition plate dividing the front side member space into front and rear spaces; and a drain hose including first and second hose portions, the first hose portion extending from a bottom portion of the charcoal canister to said front side member located in the engine compartment, the second hose portion being connected to the first hose portion and extending to said partition plate in said front side member space, the second hose portion passing through said partition plate.

2. A drain hose unit connected to a charcoal canister which is disposed in an engine compartment of an automotive vehicle, the automotive vehicle having a front side member which extends from the engine compartment toward a position under a passenger compartment, the front side member defining a space therein, said drain hose unit comprising:

a plate dividing the front side member space into front and rear spaces under the passenger compartment;

a first hose connected to a bottom portion of the charcoal canister and extending to the front side member; and a second hose disposed in the front side member space, said second hose being connected to said first hose and extending from a position in the engine compartment to a position under a passenger compartment of the automotive vehicle.

3. A device as claimed in claim 1, wherein said partition plate is sealingly connected to said front side member, and the second hose portion sealingly passes through a hole of said partition plate.

4. A device for discharging fuel vapor from a charcoal canister disposed in an engine compartment of an automotive vehicle, said device comprising:

a front side member extending from the engine compartment to a portion under a passenger compartment of the automotive vehicle, said front side member defining a space thereinside;

a partition plate connected to said front side member at the portion under the passenger compartment, said partition plate dividing the front side member space into front and rear spaces; and a drain hose including first and second hose portions, the first hose portion extending from a bottom portion of the charcoal canister to said front side member located in the engine compartment, the second hose portion being connected to the first hose portion and extending to said partition plate in said front side member space, the second hose portion passing through said partition plate, the second hose portion having a small hole which is disposed near the first portion and formed in the lateral or upward direction.

* * * * *